March 11, 1947.   J. KALNITZ   2,417,168
PARACHUTE HARNESS
Filed May 19, 1944   3 Sheets-Sheet 1
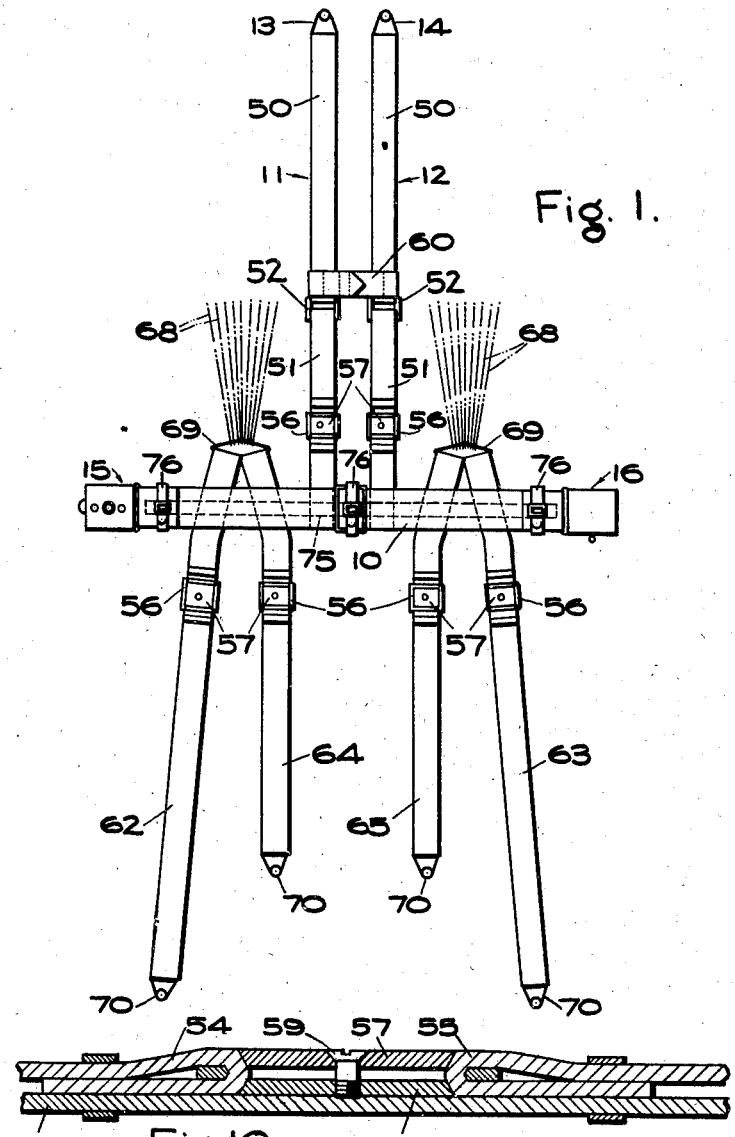
Fig. 1.
Fig. 10.
Fig. 11.
INVENTOR.
JOSEPH KALNITZ
BY
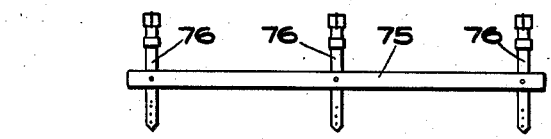

March 11, 1947.　　　J. KALNITZ　　　2,417,168
PARACHUTE HARNESS
Filed May 19, 1944　　　3 Sheets-Sheet 2
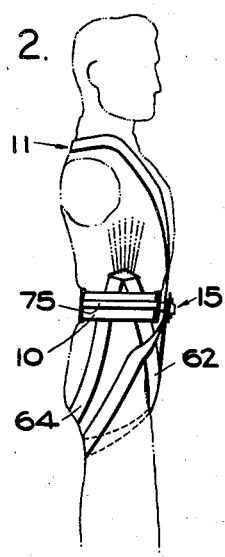
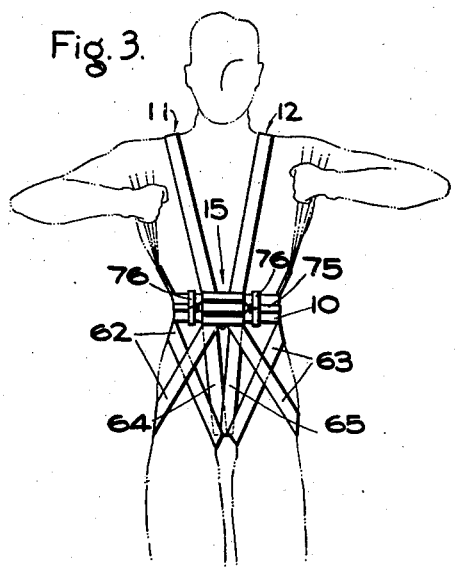
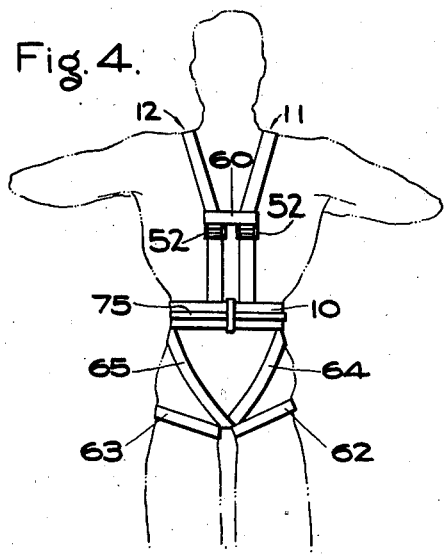
INVENTOR.
JOSEPH KALNITZ
BY
Beau, Brooks, Buckley & Beau.

March 11, 1947.  J. KALNITZ  2,417,168
PARACHUTE HARNESS
Filed May 19, 1944  3 Sheets-Sheet 3
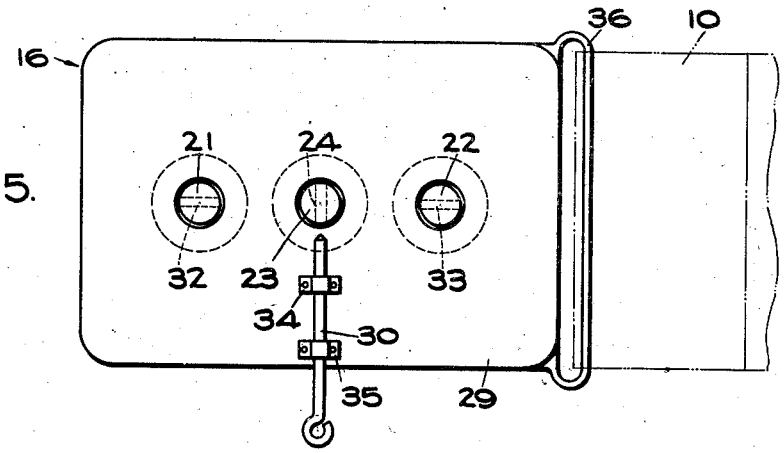
Fig. 5.
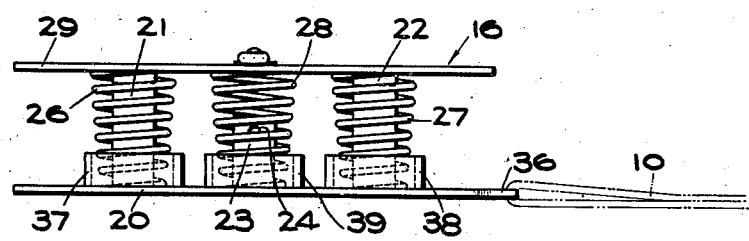
Fig. 6.
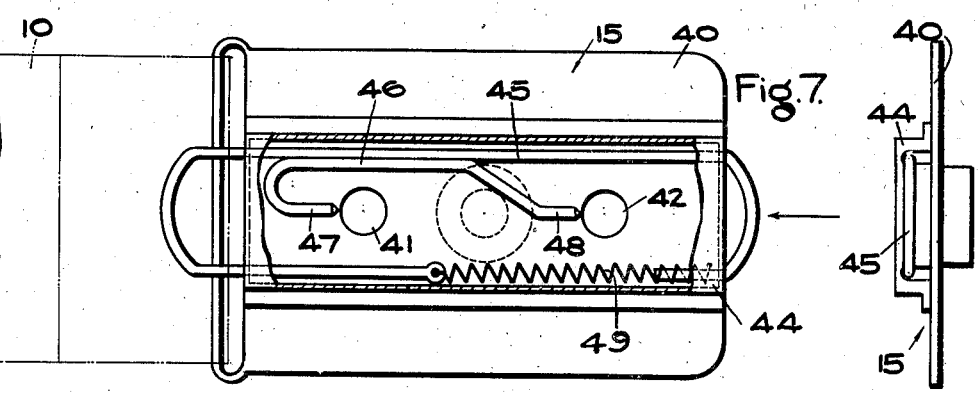
Fig. 7.
Fig. 8.
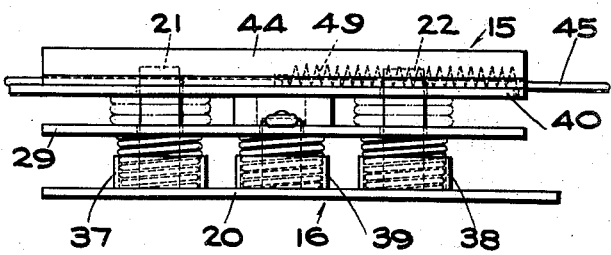
Fig. 9.
INVENTOR.
JOSEPH KALNITZ
BY
Bean, Brooks, Buckley & Bean Patented Mar. 11, 1947

2,417,168

UNITED STATES PATENT OFFICE 2,417,168

PARACHUTE HARNESS

Joseph Kalnitz, Buffalo, N. Y.

Application May 19, 1944, Serial No. 536,316

9 Claims. (Cl. 244—151)

1

This invention relates to parachute harness and particularly to a novel parachute harness which enables the user to release himself from a parachute almost instantaneously after a landing has been effected.

In the prior art many parachute harness arrangements have been proposed, some of them intended to facilitate quick release of the harness from the operator and coming under the head of what is known in the art as "single-release" harnesses. Various practical objections are present in such harnesses of the prior art. Among these are the unadvantageous postures which the harnesses impose upon the user, the limitations of freedom of movement which they impose, and the discomfort which is inherent in the manner in which the various harnesses support the body of the parachutist.

By virtue of the present invention a parachute harness is provided which supports the user advantageously and comfortably. Further, use of the harness of the present invention affords the parachutist a maximum in the way of freedom of movement and permits him to assume a relatively erect posture, if he so desires, and in fact permits him to effect a landing in whatever posture or position he desires. The freedom of movement and freedom of choice of posture thus afforded permits the parachutist to exert far greater control of the course of descent.

The manner in which the various elements of the present parachute harness are arranged and relatively associated provides a device which may be shed by the user, upon landing, with a minimum of manipulation and extremely rapidly. Further, the arrangement is such that there is substantially no possibility of improper or incomplete release or fouling of the supporting elements during release.

Various other objects and advantages attendant upon the practice of the present invention will readily occur to those skilled in the aeronautical arts from a perusal of the following specification and the accompanying drawings. While a single complete and specific embodiment of my invention is set forth in detail herein by way of example, it is to be understood that the spirit and scope of the present invention are not limited thereto, or otherwise than as defined in the appended claims.

In the drawings:

Fig. 1 is an elevational view of a preferred form of the parachute harness of the present invention shown spread out flat and looking at the

2 inner side thereof, that is, the side which is disposed against the parachutist's body;

Fig. 2 is a side elevational view showing the harness in position upon a figure;

Fig. 3 is a similar front elevational view;

Fig. 4 is a similar rear elevational view;

Fig. 5 is an elevational view of the bottom one of a pair of belt closure elements;

Fig. 6 is a view taken at right angles to Fig. 5;

Fig. 7 is an elevational view of the top one of the pair of belt closure elements with portions thereof broken away for added clearness;

Fig. 8 is an end elevational view of the element of Fig. 7;

Fig. 9 is an elevational view similar to Fig. 6 but with the top and bottom closure elements assembled;

Fig. 10 is a cross sectional view through a strap adjusting connection; and

Fig. 11 is an elevational view of a spring element which may be optionally employed in association with the waistband of the harness.

Throughout the several figures of the drawings like characters denote like parts and the numeral 10 designates a waistband element which may be considered as a main base member to which various other strap elements are firmly secured in any desired manner, such as by sewing, riveting or the like.

Referring to Fig. 1, a pair of shoulder straps designated generally 11 and 12 extend upwardly from the waistband 10 adjacent the center thereof whereby they will extend upwardly across the back of a user. The straps 11 and 12 terminate in bail elements 13 and 14 which are attachable at the front of the user in a manner which will presently appear.

The opposite ends of the waistband element 10 are provided with detachable closure elements designated generally 15 and 16 in Fig. 1. In assembling the harness upon a user the closure element 16 is placed against the front of the waist of the user and the element 15 engages over the element 16 and is securable thereto. In addition to serving as the equivalent of a buckle for the waistband 10, the closure elements 15 and 16 engage and retain the bail elements 13 and 14 as well as other bail elements which are associated with straps engaging the buttocks and thighs of the user.

The construction of the closure elements 15 and 16 is shown in detail in Figs. 5 through 9 and reference will now be had to such detailed construction. I shall refer to the closure element 16 as the bottom element since it is disposed directly against the user's body, the element 15 being placed thereover in securing the waistband. Referring to Figs. 5 and 6, the element 16 comprises a base plate 20 having a pair of locking pins 21 and 22 rigidly associated therewith, as by riveting or the like. A third shorter pin 23 is likewise rigidly associated with base plate 20 and has a transverse opening 24 formed therein to effect a preliminary setting of the element 16 incident to assembling the harness upon the body of the user.

Compression coil springs 26, 27 and 28 are disposed concentrically about the pins 21, 22 and 23 respectively and are rigidly secured at their opposite ends to the plate 20 and to a second parallel floating plate 29. Such securement may be by welding, brazing or in any other suitable manner. Fig. 6 illustrates the free position of the element 16. Preliminary to donning the harness, the user presses plates 20 and 29 toward each other until they reach the position shown in the assembled view, Fig. 9 and he secures the parts in such position by projecting a pin 30 through the opening 24 of pin 23.

This operation projects pins 21 and 22 through openings formed in plate 29 so that they protrude therefrom and thus exposes aligned openings 32 and 33, formed in pins 21 and 22. For convenience locking pin 30 may be attached to plate 29 by clips 34 and 35 which permit free axial movement of pin 30. It will be noted that one edge of base plate 20 has rigidly associated therewith a bail 36 which in the illustrated instance is formed integrally therewith and provides for secure engagement with one end of waistband 10 in any desired manner. It will be noted that collars 37, 38 and 39 are secured to plate 20 about the springs 26, 27 and 28 and these collars serve as convenient stops for plate 29 when the latter is pressed toward plate 20 during the preliminary assembly operation.

The top closure element 15 comprises a plate 40 which has openings 41 and 42 for disposition over the protruding pins 21 and 22 of the element 16. In the form shown herein the plate 40 has a channel 44 rigidly secured to its outer surface and the compartment so formed receives a loop of wire or the like 45 which has rigidly secured thereto a rod 46 formed as shown in Fig. 7 to provide a pair of locking pins 47 and 48 at its ends. The opposite ends of the relatively elongated loop 45 project from the channel 44 for ready manipulation. An extension coil spring 49 extends between an end of loop 45 and a fixed part on the plate 40 or the channel 44 and normally urges the loop 45 to a position to the right of that illustrated in Fig. 7.

Movement of loop 45 to the position shown in Fig. 7 is effected by grasping the left hand end of loop 45 and withdrawing it. This permits openings 41 and 42 to be disposed over pins 21 and 22 and release of the loop 45 projects pins 47 and 48 through openings 32 and 33 to effectively lock elements 15 and 16 together. Preliminary to placing the element 15 over the element 16, several bails like the ones designated 13 and 14 in Fig. 1 are disposed over pins 21 and 22, so that in addition to locking the ends of waistband 10, the plate 40 locks such bails to the assembled closure 15, 16. After the closure is so affected temporary locking pin 30 is withdrawn so that subsequently, when it is desired to shed the harness, the user may merely withdraw the left end of the loop 45 (which will be the end at the user's right hand) which permits the spring 26, 27 and 28 to instantly throw plate 40 from its position about pins 21 and 22 and simultaneously throws from pins 21 and 22 all of the strap bails which may be disposed thereabout.

Each of the straps 11 and 12 comprises two continuous loops 50 and 51 extending in opposite directions from conventional buckle elements 52 to which the parachute pack is conventionally secured. The outer loops 50 may be permanently secured in continuous form but the inner loops 51 each have their opposite ends removably gripped in adjusting devices, one of which is shown in longitudinal cross section in Fig. 9. Referring to that figure, the opposite ends of a loop 51 are designated 54 and 55 and extend through and are doubled back upon the opposite sides of an open rectangular frame element 56.

A pair of locking plates 57 and 58 engage in opposite sides of frame element 56 and are beveled to complement the inner edge formation of frame 56. Screw means 59 are provided for securely clamping each pair of locking plates 57 and 58 to adjustably lock the ends 54 and 55 of loop 51. A loop 60 serves to maintain proper spacing of straps 11 and 12 as shown in Figs. 1 and 4.

In addition to the shoulder straps 11 and 12, the waistband 10 has fixed thereto four generally depending straps 62, 63, 64 and 65, each of which comprises a loop similar to the loops 51 and each of which is provided with the strap-adjusting locking elements 56, 57 and 58 previously described. All of the straps 62 through 65 project a short distance above the waistband 10 for engagement with parachute shroud lines indicated schematically in dot and dash lines at 68 in Fig. 1. Connection may be by means of rigid metal or other bails or loops 69 engaging through the looped straps.

The straps designated 62 and 63 may be described as front straps, since they engage waistband 10 at the front of the user, while those designated 64 and 65 are rear straps. Each of the looped straps 62 through 65 has a bail loop 70 for engagement over the pins 21 and 22 of the closure element 16, in a manner similar to the engagement of bails 13 and 14 of the shoulder straps.

Referring to Figs. 2 through 4, the front straps 62 and 63 pass downwardly through the user's crotch, then rearwardly across his thighs just below the buttocks, thence diagonally upwardly to the closure 15, 16. The rear straps extend downwardly across the buttocks, through the crotch, thence upwardly to the closure 15, 16. The particular strap support arrangement is found to give vastly better support to a parachutist, from all standpoints, than any heretofore proposed. All six of the strap bails 13, 14 and 70 are instantly and certainly released when the parachutist pulls loop 45 to disengage elements 15 and 16 and the entire harness falls readily from his body.

I provide special means which may be employed optionally for automatically spreading the waistband element when the closure 15, 16 is opened. Such means is shown in detail in Fig. 11 and comprises essentially a strip 75 of spring steel or other resilient material having secured thereto several transverse straps 76. The straps are readily attachable about waistband 10, as shown in Figs. 2, 3 and 4 and when the waistband is opened the strip 75 springs to straightened position, carrying the waistband 10 with it.

What is claimed is:

1. Parachute harness comprising a waist-encircling band and means for engaging said band with a parachute, a pair of shoulder straps each secured at one end to a rear portion of the waistband and attachable at their free ends to the front thereof, a pair of straps secured to and depending from the front of said waistband for passing between a user's legs and rearwardly about his thighs for securement of the free ends thereof to the front of said waistband, and a second pair of straps secured to and depending from the rear of said waistband for passing between the user's leg and for securement of the free ends thereof to the front of said waistband.

2. Parachute harness comprising a waist-encircling band and means for engaging said band with a parachute, a pair of shoulder straps each secured at one end to a rear portion of the waistband and attachable at their free ends to the front thereof, a pair of straps secured to and depending from the front of said waistband for passing between a user's legs and rearwardly about his thighs for securement of the free ends thereof to the front of said waistband, and a second pair of straps secured to and depending from the rear of said waistband for passing between the user's legs and for securement of the free ends thereof to the front of said waistband, said waistband having closure means at the front thereof, said closure means being engageable with the free ends of said three pairs of straps to secure them in assembled position.

3. Parachute harness comprising a waist-encircling band and means for engaging said band with a parachute, a pair of shoulder straps each secured at one end to a rear portion of the waistband and attachable at their free ends to the front thereof, a pair of straps secured to and depending from the front of said waistband for passing between a user's legs and rearwardly about his thighs for securement of the free ends thereof to the front of said waistband, and a second pair of straps secured to and depending from the rear of said waistband for passing between the user's legs and for securement of the free ends thereof to the front of said waistband, said waistband having closure means at the front thereof, said closure means being engageable with the free ends of said three pairs of straps to secure them in assembled position, and means for simultaneously opening said waistband closure and releasing all of said straps to permit the user to shed the harness.

4. Parachute harness comprising a waist-encircling band and a plurality of body engaging straps extending therefrom, each of said straps having a loop element at its outer end, closure means for said waistband including a pair of separable elements carried by opposite ends of the waistband, one of said elements having a projection thereon and the other having an opening securable over said projection, said several strap loops being disposable over said projection before assembly of said closure means whereby said separable elements simultaneously retain the straps in body engaging position and maintain the waistband closed, and releasable means carried by said other element for locking the one of said elements to the other with the projection in said opening, said releasable means being mounted on said other element for guided movement between locking and non-locking positions.

5. Parachute harness comprising a waist-encircling band and a plurality of body engaging straps extending therefrom, each of said straps having a loop element at its outer end, closure means for said waistband including a pair of separable elements carried by opposite ends of the waistband, one of said elements having a projection thereon and the other having an opening securable over said projection, said several strap loops being disposable over said projection before assembly of said closure means whereby said separable elements simultaneously retain the straps in body engaging position and maintain the waistband closed, releasable means for locking the one of said elements to the other, and resilient means for automatically disengaging said strap loops and said other element from said projection when said locking means is released.

6. Parachute harness comprising a waist-encircling band and means for engaging said band with a parachute, means secured to the waistband and engageable with the upper portion of a user's body, a pair of straps secured to and depending from the front of said waistband for passing between a user's legs and rearwardly about his thighs for securement of the free ends thereof to the front of said waistband, and a second pair of straps secured to and depending from the rear of said waistband for passing between the user's legs for securement of the free ends thereof to the front of said waistband.

7. Parachute harness comprising a waist-encircling band and means for engaging said band with a parachute, a pair of shoulder straps each secured at one end to a rear portion of the waistband and terminating at the front thereof, in a loop element a pair of straps secured to and depending from the front of said waistband for passing between a user's legs and rearwardly about his thighs and terminating at the front of said waistband in loop elements, and a second pair of straps secured to and depending from the rear of said waistband for passing between the user's legs and terminating at the front of said waistband in loop elements, closure means for said waistband including a pair of separable elements carried by opposite ends thereof and closable at the front thereof, said closure means including means for engaging the loop elements of all of said straps to provide single assembly and release means for said harness.

8. Parachute harness comprising a waist-encircling band and means for engaging said band with a parachute, a pair of shoulder straps each secured at one end to a rear portion of the waistband and terminating at the front thereof, a pair of straps secured to and depending from the front of said waistband for passing between a user's legs and rearwardly about his thighs and terminating at the front of said waistband, and a second pair of straps secured to and depending from the rear of said waistband for passing between the user's legs and likewise terminating at the front of said waistband, closure means for said waistband including a pair of separable elements carried by opposite ends thereof and closable at the front thereof, said closure means including means for engaging the terminals of all of said straps to provide single assembly and release means for said harness.

9. Parachute harness comprising a flexible waist-encircling band and a plurality of body engaging straps extending therefrom, closure means at opposite ends of said waistband for securing the same about the waist of a user, and a flat resilient plate secured to the waistband and flexed into waist-encircling position by assembly of the waistband upon a user, said plate being adapted to automatically spread said waistband upon release of said closure means, said plate being provided with a plurality of fasteners for ready attachment to and detachment from said waistband for optional employment thereof.

JOSEPH KALNITZ.

REFERENCES CITED

The following references are of record in the file of this patent:

UNITED STATES PATENTS

| Number | Name | Date |
|---|---|---|
| 1,295,963 | Calthrop | Mar. 4, 1919 |
| 2,287,812 | Manson | June 30, 1942 |
| 2,179,506 | Jahant | Nov. 14, 1939 |
| 1,177,927 | Calthrop | Apr. 4, 1916 |
| 2,192,109 | Smith | Feb. 27, 1940 |

FOREIGN PATENTS

| Number | Country | Date |
|---|---|---|
| 243,445 | Haig (Br.) | Nov. 30, 1925 |
| 566,680 | Gouet (Fr.) | Nov. 26, 1923 |
| 698,671 | Wattel (Fr.) | Nov. 28, 1930 |